United States Patent
Miyata

(10) Patent No.: US 8,914,753 B2
(45) Date of Patent: Dec. 16, 2014

(54) WEB PAGE DISPLAY APPARATUS AND WEB PAGE DISPLAY METHOD

(75) Inventor: Hiromasa Miyata, Tokyo (JP)

(73) Assignee: Sony Corporation, Tokyo (JP)

( * ) Notice: Subject to any disclaimer, the term of this patent is extended or adjusted under 35 U.S.C. 154(b) by 1019 days.

(21) Appl. No.: 12/427,148

(22) Filed: Apr. 21, 2009

(65) Prior Publication Data

US 2009/0300555 A1 Dec. 3, 2009

(30) Foreign Application Priority Data

May 29, 2008 (JP) ................................. 2008-141175

(51) Int. Cl.
- G06F 3/14 (2006.01)
- G09G 5/00 (2006.01)
- G06F 17/30 (2006.01)
- G06F 3/0488 (2013.01)
- H04M 1/725 (2006.01)

(52) U.S. Cl.
CPC ............ G09G 5/00 (2013.01); *G09G 2340/145* (2013.01); *G09G 2340/0407* (2013.01); *H04M 1/72561* (2013.01); G06F 17/30905 (2013.01); G06F 3/0488 (2013.01); *G09G 2370/027* (2013.01)
USPC ....................................................... 715/864

(58) Field of Classification Search
CPC ........................................................ G06F 3/14
USPC .......................................................... 715/864
See application file for complete search history.

(56) References Cited

U.S. PATENT DOCUMENTS

| | | | | |
|---|---|---|---|---|
| 2002/0027570 A1* | 3/2002 | Muto et al. | ..................... | 345/782 |
| 2006/0062362 A1 | 3/2006 | Davis | | |
| 2006/0195784 A1* | 8/2006 | Koivisto et al. | ............... | 715/523 |
| 2006/0200778 A1* | 9/2006 | Gritzman et al. | ............. | 715/781 |
| 2007/0250768 A1* | 10/2007 | Funakami et al. | ............. | 715/521 |
| 2008/0168388 A1* | 7/2008 | Decker | ......................... | 715/800 |
| 2008/0307308 A1* | 12/2008 | Sullivan et al. | ............... | 715/723 |

FOREIGN PATENT DOCUMENTS

| | | |
|---|---|---|
| EP | 1 752 880 A1 | 2/2007 |
| JP | 2001-243151 | 9/2001 |
| JP | 2003-122551 | 4/2003 |
| JP | 2006-19780 | 1/2006 |
| JP | 2007-4524 | 1/2007 |
| WO | WO 2004/031994 A1 | 4/2004 |
| WO | WO 2005/106684 A1 | 11/2005 |
| WO | WO 2008/041743 A1 | 4/2008 |
| WO | WO 2008/085747 A2 | 7/2008 |
| WO | WO 2008/085747 A3 | 7/2008 |

* cited by examiner

*Primary Examiner* — Boris Pesin
*Assistant Examiner* — Angie Badawi
(74) *Attorney, Agent, or Firm* — Oblon, Spivak, McClelland, Maier & Neustadt, L.L.P.

(57) ABSTRACT

A Web page display apparatus includes: an acquisition unit for acquiring a Web page; a generation unit for generating a reduced Web page by reducing the Web page so that the particular element has a width smaller than that of the display size when a user-specified particular element in a plurality of elements constituting the Web page has a width greater than that of display size of a display unit; and a display control unit for controlling the display unit to display a particular reduced element of the reduced Web page corresponding to the particular element when the particular element has a width greater than that of the display size.

20 Claims, 14 Drawing Sheets

HD HTML DATA

```
<html>
<head>
 <title>Toto Dome Town</title>
 <link rel="stylesheet" href="dome.css">
</head>
<body>
 <div class="container">
  <div class="header">Toto Dome Town</div>
  <div class="sidebar">Toto Dome<BR>Laguna<BR>Toto Dome Town<BR></div>
  <div class="contents"><img src="dome.jpg" align=left>Contents<BR>
   Today's Game<BR>Shinjin vs. Nainichi<BR>
   Starters: Shimohara vs. Kawashimo<BR>
   Open 15:00 Start 18:00<BR>In Bottom of 5th, Shinjin at bat<BR>
   S 5-2 N<BR></div>
  <div class="footer">Aaa ... Bbb, Ccc-cho, Chuo-ku, Tokyo<BR>
   Toto Dome Co., Ltd.<BR></div>
 </div>
</body>
</html>
```

FIG. 5A

CD CSS DATA

```
.container{width: 1024px;}
.header{width: 1024px;height: 150;}
.sidebar{float: left;width: 224px;}
.contents{float: left;width: 800px;}
.footer{clear: both;width: 1024px;height: 150;}
```

FIG. 5B

WEB PAGE DISPLAY APPARATUS AND WEB PAGE DISPLAY METHOD

BACKGROUND OF THE INVENTION

1. Field of the Invention

The present invention relates to a Web page display apparatus and a Web page display method, and is suitably applicable to, for example, a personal digital assistant (PDA).

2. Description of the Related Art

Web pages written in hypertext markup language (HTML) format using World Wide Web (WWW) document systems have been created for the sake of browsing a display screen of fairly large size (for example, extended graphics array (XGA) of 1024 pixels in width and 768 pixels in height) of a personal computer or the like.

On the other hand, PDAs have been equipped with a quarter video graphics array (QVGA) display of 320 pixels in width and 240 pixels in height, for example, and can display Web pages on the display.

For example, a PDA reduces a Web page W1 of 1024 pixels in width such as shown in FIG. 1A to generate a reduced Web page W2 of 320 pixels in width such as shown in FIG. 1B.

The PDA then sets the upper 240-pixel part of the reduced Web page W2 as a display area WA1, and displays a display screen DG1 corresponding to the display area WA1 on the display as shown in FIG. 1C (refer to, e.g., Jpn. Pat. Appln. Laid-Open Publication No. 2007-004524).

SUMMARY OF THE INVENTION

Since the foregoing PDA reduces the entire Web page W1 into the reduced Web page W2 according to the display size of the display, it is not possible to display the Web page W1 on the display in an optimum size intended for user's visual observation. There has thus been a problem of impaired viewability to the user.

The present invention has been made in view of the foregoing circumstances, and is to provide a Web page display apparatus and a Web page display method capable of displaying a Web page in an easily viewable fashion.

To solve the foregoing problem, a Web page display apparatus according to an aspect of the present invention includes: an acquisition unit for acquiring a Web page; a generation unit for generating a reduced Web page by reducing the Web page so that the particular element has a width smaller than that of the display size when a user-specified particular element in a plurality of elements constituting the Web page has a width greater than that of display size of a display unit; and a display control unit for controlling the display unit to display a particular reduced element of the reduced Web page corresponding to the particular element when the particular element has a width greater than that of the display size.

Consequently, when the particular element selected by the user is greater than the display size, the Web page is reduced and displayed so that the particular element is smaller than the display size. This makes it possible to display the particular element in an appropriate size on the display unit.

A Web page display method according to another aspect of the present invention includes: an acquisition step of acquiring a Web page by means of an acquisition unit; a generation step of generating a reduced Web page by reducing the Web page so that the particular element has a width smaller than that of the display size by means of a generation unit when a user-specified particular element in a plurality of elements constituting the Web page has a width greater than that of display size of a display unit; and a display control step of controlling the display unit to display a particular reduced element of the reduced Web page corresponding to the particular element by means of a display control unit when the particular element has a width greater than that of the display size.

Consequently, when the particular element selected by the user is greater than the display size, the Web page is reduced and displayed so that the particular element is smaller than the display size. This makes it possible to display the particular element in an appropriate size on the display unit.

According to the present invention, when the particular element selected by the user is greater than the display size, the Web page is reduced and displayed so that the particular element is smaller than the display size. The particular element can thus be displayed in an appropriate size on the display unit. This makes it possible to achieve a Web page display apparatus and a Web page display method that can display a Web page in an easily viewable fashion.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 5A and 5B are schematic diagrams showing the configuration of Web page data;

DETAILED DESCRIPTION OF THE PREFERRED EMBODIMENTS

Hereinafter, an embodiment of the present invention will be described in detail with reference to the drawings.

(1) Configuration of Web Page Acquisition and Display System

(1-1) Overall Configuration of Web Page Acquisition and Display System

Figure 1A:
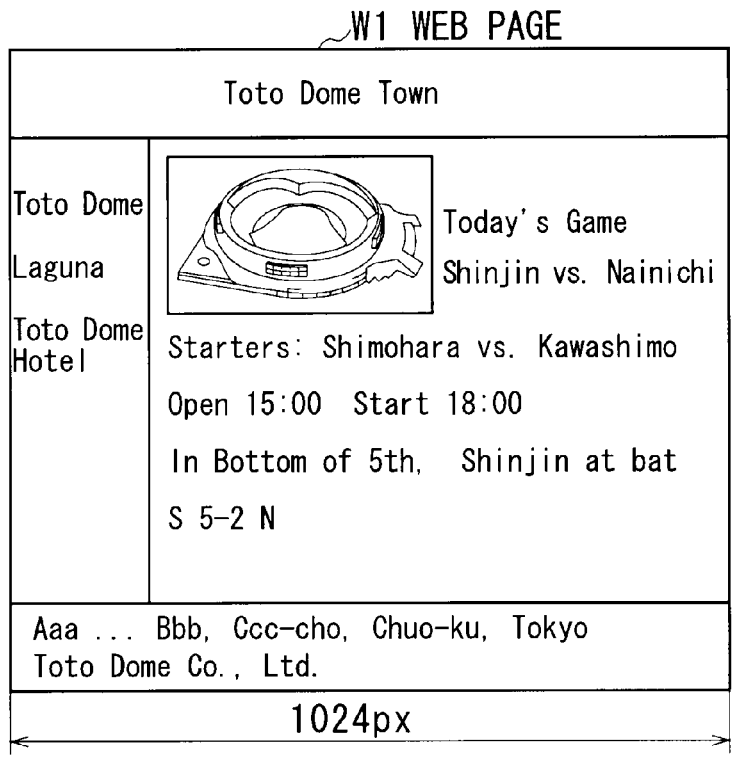
FIGS. 1A to 1C are schematic diagrams showing how conventional reduced display is carried out.
Figure 1B:
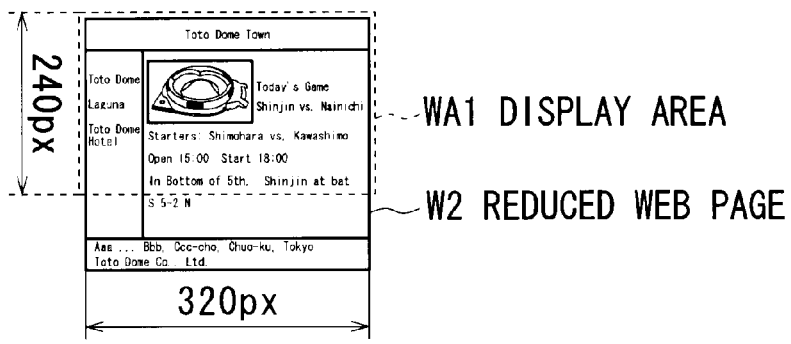
Figure 1C:
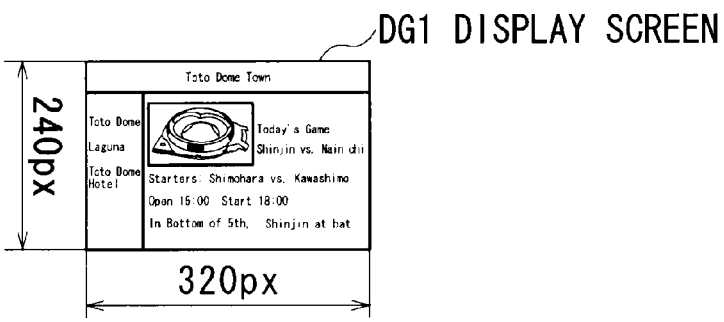
Figure 2:
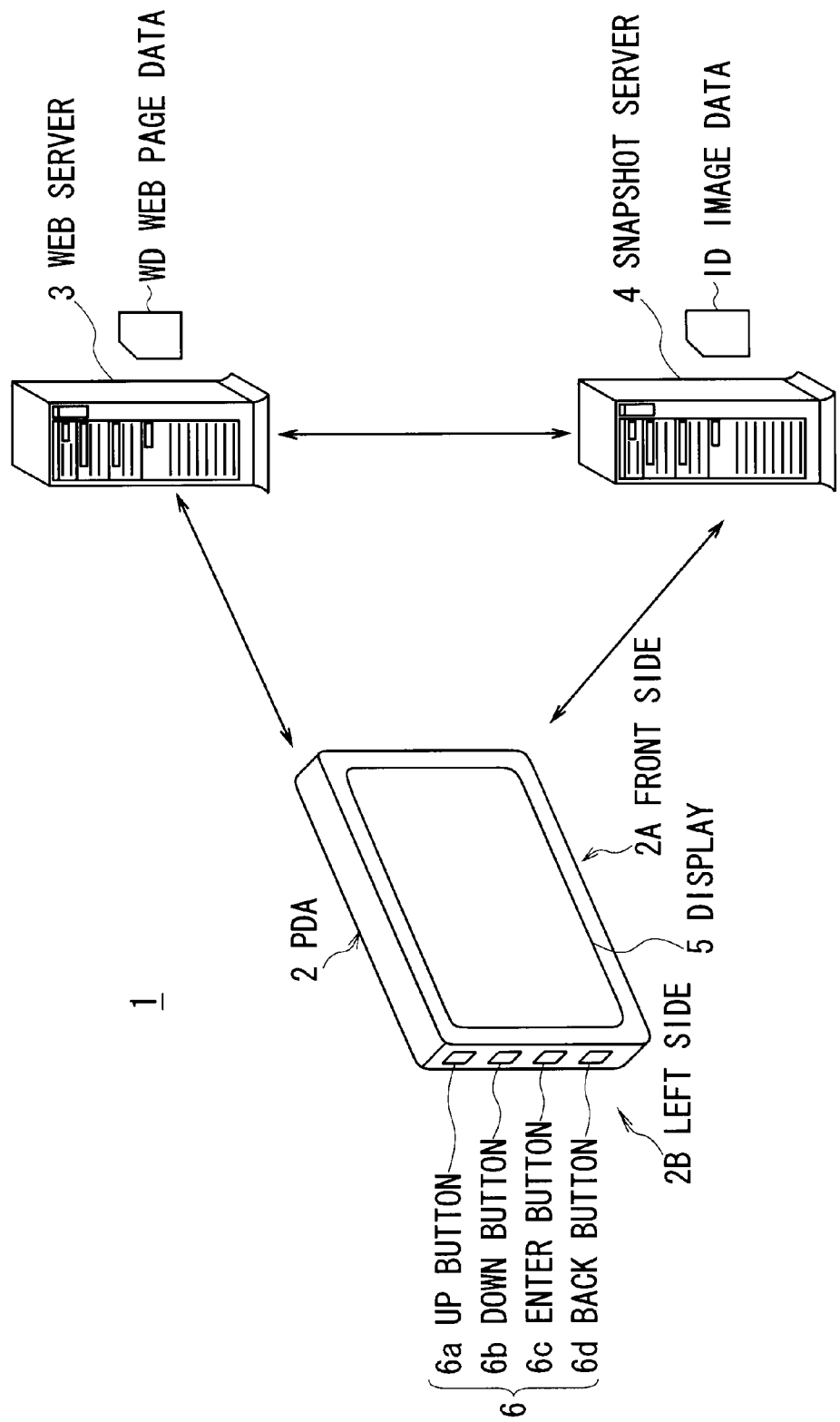
FIG. 2 is a schematic diagram showing the overall configuration of a Web page acquisition and display system.

FIG. 2 shows a Web page acquisition and display system 1 which is an embodiment of the present invention. The Web page acquisition and display system 1 includes a PDA 2, a Web server 3, and a snapshot server 4, which are connected over the Internet, for example.

The PDA 2 has a QVGA display 5 on its front side 2A, and an operation button group 6 including an up button 6a, a down button 6b, an enter button 6c, and a back button 6d on its left side 2B. The display 5 and the operation button group 6 function as a user interface.

According to a predetermined operation by a user, the PDA 2 transmits a request message for acquiring data on a predetermined Web page (hereinafter, referred to as Web page data) to the Web server 3.

The Web server 3 contains a large number of pieces of Web page data. The Web server 3 transmits Web page data WD corresponding to the request message received from the PDA 2 to the PDA 2.

In the meantime, the Web server 3 transmits to the snapshot server 4 the Web page data WD that is transmitted to the PDA 2 and log data (not shown) that indicates the transmission of the Web page data WD to the PDA 2.

The snapshot server 4 generates image data (to be described later) ID based on the Web page data WD received from the Web server 3, and transmits the image data ID to the PDA 2 based on the log data.

(1-2) Circuit Configuration of PDA

Figure 3:
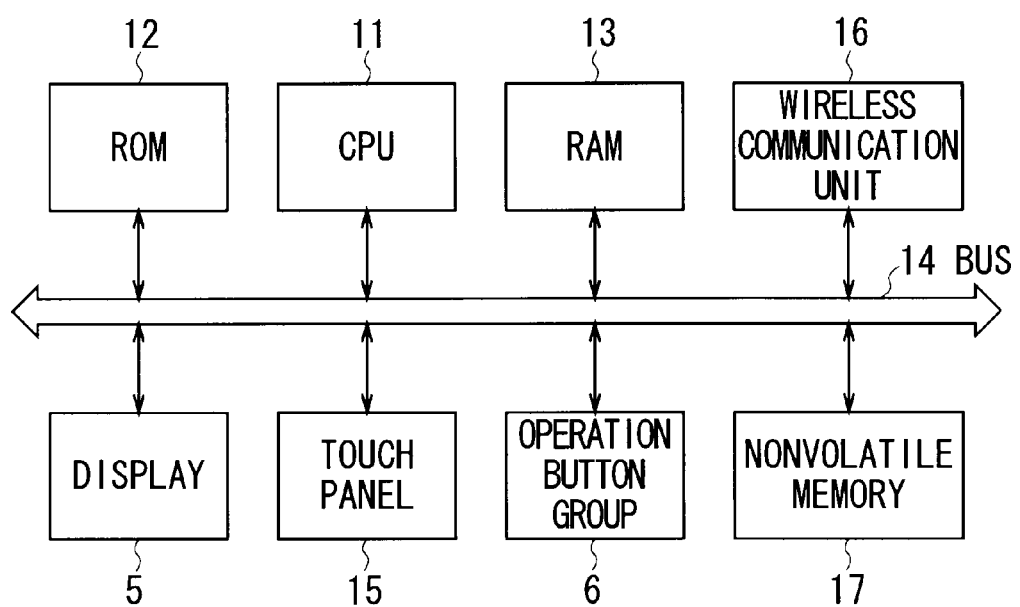
FIG. 3 is a schematic diagram showing the circuit configuration of a PDA.

As shown in FIG. 3, the PDA 2 exercises centralized control on the entire apparatus through a bus 14 according to a basic program that is read from a read only memory (ROM) 12 and run on a random access memory (RAM) 13 by a central processing unit (CPU) 11.

The PDA 2 can also perform various types of processing, such as optimum layout display processing to be described later, according to various application programs that are read from the ROM 12 and run on the RAM 13 by the CPU 11.

The PDA 2 has a wireless communication unit 16 such as an Institute of Electrical and Electronic Engineers (IEEE) 802.11 wireless communication module. The PDA 2 establishes a wireless connection with the Web server 3 and the snapshot server 4 through the wireless communication unit 16.

According to a user operation on a touch panel 15 which is arranged on the surface of the display 5, the CPU 11 of the PDA 2 receives, for example, the Web page data WD from the Web server 3 through the wireless communication unit 16. The CPU 11 then stores the Web page data WD into a non-volatile memory 17.

(1-3) Circuit Configuration of Web Server

Figure 4:
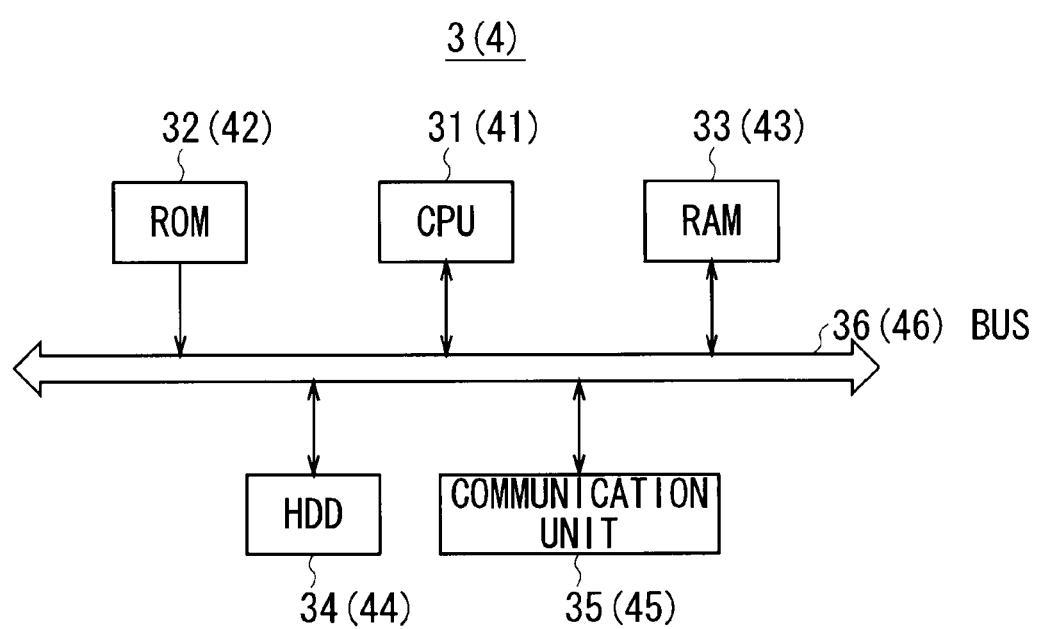
FIG. 4 is a schematic diagram showing the circuit configuration of a Web server and a snapshot server.

As shown in FIG. 4, the Web server 3 exercises centralized control on the entire apparatus through a bus 36 according to a basic program that is read from a ROM 32 and run on a RAM 33 by a CPU 31. The Web server 3 can also perform various types of processing according to various application programs.

The CPU 31 of the Web server 3 stores a large number of pieces of Web page data in a hard disk drive 34. For example, when the CPU 31 of the Web server 3 receives a request message from the PDA 2 through a communication unit 35, the CPU 31 transmits Web page data WD corresponding to the request message to the PDA 2 through the communication unit 35.

When transmitting the Web page data WD to the PDA 2, the CPU 31 of the Web server 3 also transmits the Web page data WD and log data to the snapshot server 4 through the communication unit 35.

(1-4) Circuit Configuration of Snapshot Server

The snapshot server 4 (FIG. 4) has the same basic configuration as that of the Web server 3. The snapshot server 4 exercises centralized control on the entire apparatus through a bus 46 according to a basic program that is read from a ROM 42 and run on a RAM 43 by a CPU 41. The snapshot server 4 can also perform various types of processing according to various application programs.

When the CPU 41 of the snapshot server 4 receives Web page data WD and log data from the Web server 3 through a communication unit 45, the CPU 41 stores the Web page data WD into a hard disk drive 44.

The CPU 41 of the snapshot server 4 generates image data ID based on the Web page data WD received from the Web server 3, and transmits the image data ID to the PDA 2 through the communication unit 45 based on the log data.

(2) Optimum Layout Display Processing

Next, description will be given of the optimum layout display processing which is intended to display a Web page corresponding to user-desired Web page data WD onto the display 5 of the PDA 2 so as to be easily viewable to the user.

For example, when a predetermined uniform resource locator (URL) is entered by user's touch operations on the touch panel 15 which is arranged on the surface of the display 5, the CPU 11 of the PDA 2 transmits a request message to the Web server 3 through the wireless communication unit 16 in order to acquire Web page data WD corresponding to the URL.

When the CPU 31 of the Web server 3 receives the request message from the PDA 2 through the communication unit 35, the CPU 31 reads the Web page data WD corresponding to the request message from the hard disk drive 34, and transmits the Web page data WD to the PDA 2 through the communication unit 35.

When transmitting the Web page data WD to the PDA 2, the CPU 31 of the Web server 3 also transmits the Web page data WD and log data, which indicates the transmission of the Web page data WD to the PDA 2, to the snapshot server 4 through the communication unit 35.

Here, the Web page data WD is composed of HTML data HD which is written in HTML format as shown in FIG. 5A, cascading style sheets (CSS) data CD which describes the layout of the Web page as shown in FIG. 5B, and image data (not shown) with a filename "dome.jpg".

The HTML data HD declares that the portions sandwiched between an <html> tag and a </html> tag is written in HTML format. The title of the Web page and information pertaining to the Web page are described in the portion sandwiched between a <head> tag and a </head> tag. The HTML data HD describes the main body of the Web page in the portion sandwiched between a <body> tag and a </body> tag.

The HTML data HD also includes '<link rel="stylesheet" href="dome.css">', which describes that the contents of the CSS data CD having the filename "dome.css" can be consulted as a style sheet.

Figure 6A:
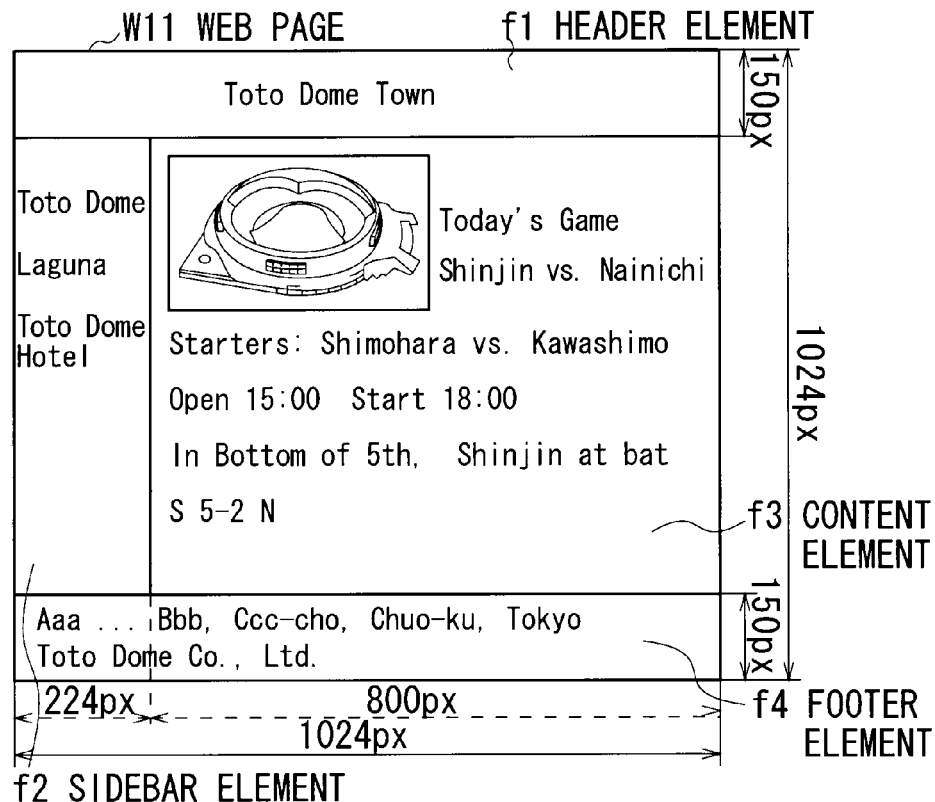
FIGS. 6A to 6C are schematic diagrams showing the configuration of image data.

When the CPU 41 of the snapshot server 4 receives the Web page data WD from the Web server 3 through the communication unit 45, the CPU 41 stores the Web page data WD into the hard disk drive 44 and generates a Web page W11 based on the Web page data WD as shown in FIG. 6A.

Specifically, the CPU 41 of the snapshot server 4 sets the width of the Web page W11 at 1024 pixels based on the portion sandwiched between the <div class="container"> tag and the </div> tag immediately before the </body> tag in the HTML data HD, and the description ".container{width: 1024 px;}" in the CSS data CD.

Note that the CPU 41 of the snapshot server 4 sets the width of the Web page W11 at 1024 pixels by default if the CSS data CD of the Web page data WD does not contain a description of the width of the Web page W11 such as ".container{width: 1024 px;}".

The CPU 41 of the snapshot server 4 also sets the height of the Web page W11, for example, at 1024 pixels by default if the height of the Web page W11 is not defined in the HTML data HD or the CSS data CD.

The CPU 41 of the snapshot server 4 places an element f1 that is defined by the description '<div class="header">Toto Dome Town</div>' in the HTML data HD and '.header{width: 1024 px; height: 150;}' in the CSS data CD (hereinafter, this element will be referred to as a header element) to the top of the Web page W11. Here, the CPU 41 of the snapshot server 4 sets the width and height of the header element f1 at 1024 pixels and 150 pixels, respectively.

The CPU 41 of the snapshot server 4 places an element f2 that is defined by the description '<div class="sidebar"> . . . Toto Dome Hotel<BR></div>' in the HTML data HD and '.sidebar{float: left; width: 224 px;}' in the CSS data CD (hereinafter, this element will be referred to as a sidebar element) on the lower left of the header element f1. Here, the CPU 41 of the snapshot server 4 sets the width of the sidebar element f2 at 224 pixels.

The CPU 41 of the snapshot server 4 places an element f3 that is defined by the description '<div class="contents"> . . . S 5-2 N<BR></div>' in the HTML data HD and '.contents{float: left; width: 800 px;}' in the CSS data CD (hereinafter, this element will be referred to as a content element) on the right of the sidebar element f2. Here, the CPU 41 of the snapshot server 4 sets the width of the content element f3 at 800 pixels.

The CPU 41 of the snapshot server 4 places an element f4 that is defined by the description '<div class="footer"> . . . Toto Dome Co., Ltd.<BR></div>' in the HTML data HD and '.footer{clear: both; width: 1024 px; height: 150;}' in the CSS data CD (hereinafter, this element will be referred to as a footer element) under the sidebar element f2 and the content element f3. Here, the CPU 41 of the snapshot server 4 sets the width and height of the footer element f4 at 1024 pixels and 150 pixels, respectively.

In consequence, the CPU 41 of the snapshot server 4 sets the height of the sidebar element f2 and the content element f3 at 724 pixels, which is determined by subtracting the heights of the header element f1 and footer element f4, or 150 pixels each, from the height of the entire Web page W11, or 1024 pixels.

Figure 6B:
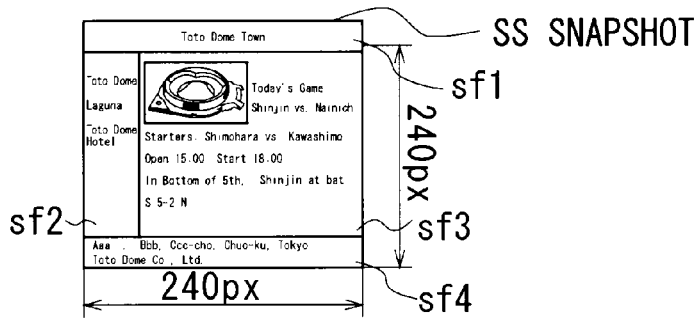

The CPU 41 of the snapshot server 4 thus generates the Web page W11 before generating a snapshot SS. The snapshot SS refers to an image into which the Web page W11 is reduced so as to have a width of 240 pixels as shown in FIG. 6B.

The snapshot SS includes a reduced header element sf1, a reduced sidebar element sf2, a reduced content element sf3, and a reduced footer element sf4 which correspond to the header element f1, the sidebar element f2, the content element f3, and the footer element f4 of the Web page W11, respectively.

Figure 6C:
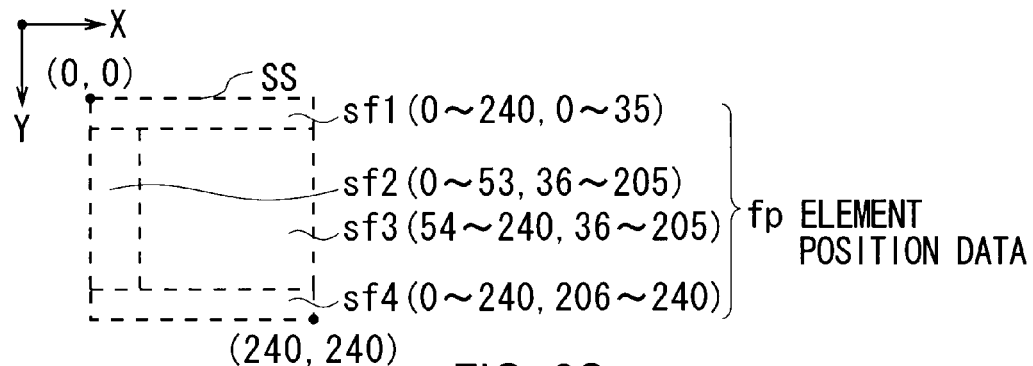

As shown in FIG. 6C, the CPU 41 of the snapshot server 4 establishes coordinate axes including an X-axis extending to the right and an Y-axis to the bottom with the vertex at the top left of the snapshot SS as (0,0). The CPU 41 of the snapshot server 4 then calculates to determine to which each of the pixels of the snapshot SS pertains in the reduced header element sf1, the reduced sidebar element sf2, the reduced content element sf3, and the reduced footer element sf4, and generates element position data fp that shows the calculations.

More specifically, the element position data fp shows that the range of coordinates (0 to 240, 0 to 35) of the snapshot SS corresponds to the reduced header element sf1. Similarly, the element position data fp shows that the range of coordinates (0 to 53, 36 to 205) of the snapshot SS corresponds to the reduced sidebar element sf2, the range of coordinates (54 to 240, 36 to 205) corresponds to the reduced content element sf3, and the range of coordinates (0 to 240, 206 to 240) corresponds to the reduced footer element sf4.

The CPU 41 of the snapshot server 4 then transmits image data ID including the snapshot SS (FIG. 6B) and the element position data fp (FIG. 6C) to the PDA 2 through the communication unit 45.

When the CPU 11 of the PDA 2 receives the Web page data WD from the Web server 3 and the image data ID from the snapshot server 4 through the wireless communication unit 16, the CPU 11 stores the Web page data WD and the image data ID into the nonvolatile memory 17.

Figure 7A:
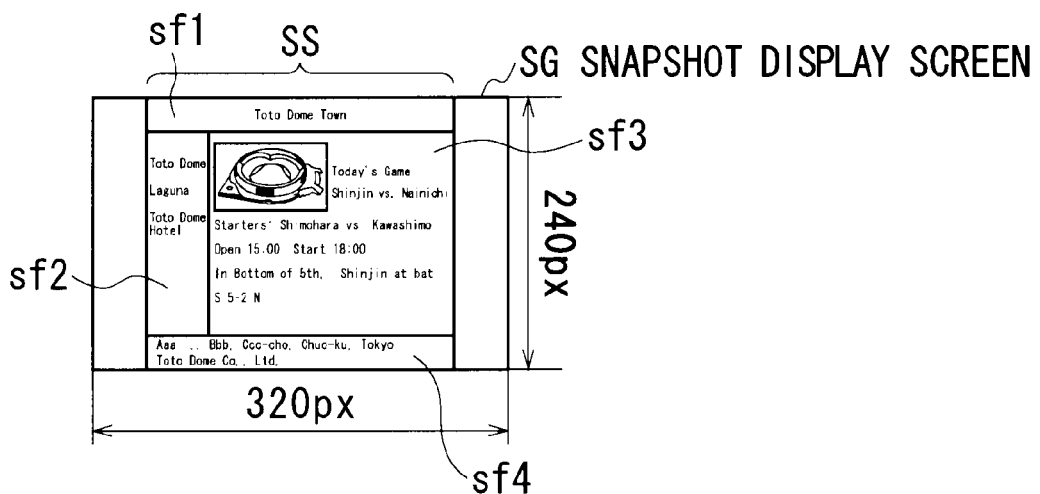
FIGS. 7A and 7B are schematic diagrams showing the configuration of a snapshot display screen and how to detect the coordinate position.

The CPU 11 of the PDA 2 then displays a snapshot display screen SG, in the center of which appears the snapshot SS of the image data ID stored in the nonvolatile memory 17, on the display 5 as shown in FIG. 7A.

By displaying the snapshot SS on the display 5 via the snapshot display screen SG, the PDA 2 can thus make the user visually observe the overall configuration of the Web page W11 corresponding to the Web page data WD acquired from the Web server 3.

Figure 7B:
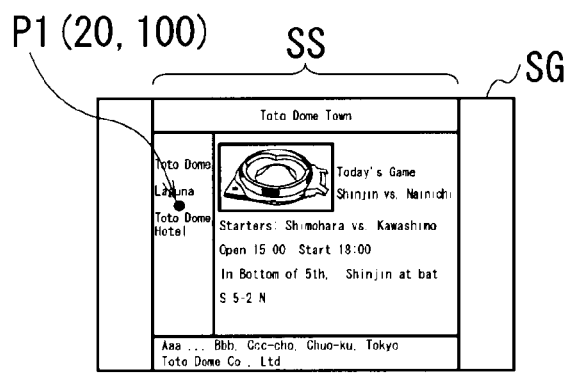

Subsequently, when the touch panel 15 arranged on the surface of the display 5 is touched by the user with the snapshot display screen SG on the display 5, the CPU 11 of the PDA 2 calculates the coordinate values (20, 100) of the touched point P1 as shown in FIG. 7B.

The CPU 11 of the PDA 2 then reads the element point data fp (FIG. 6C) of the image data ID from the nonvolatile memory 17, and compares the coordinate values (20,100) of the point P1 touched by the user and the element point data fp to determine that the reduced sidebar element sf2 of the snapshot SS is touched by the user.

That is, the CPU 11 of the PDA 2 can determine that the sidebar element f2 of the Web page W11 corresponding to the reduced sidebar element sf2 of the snapshot SS is touched by the user.

Figure 8A:
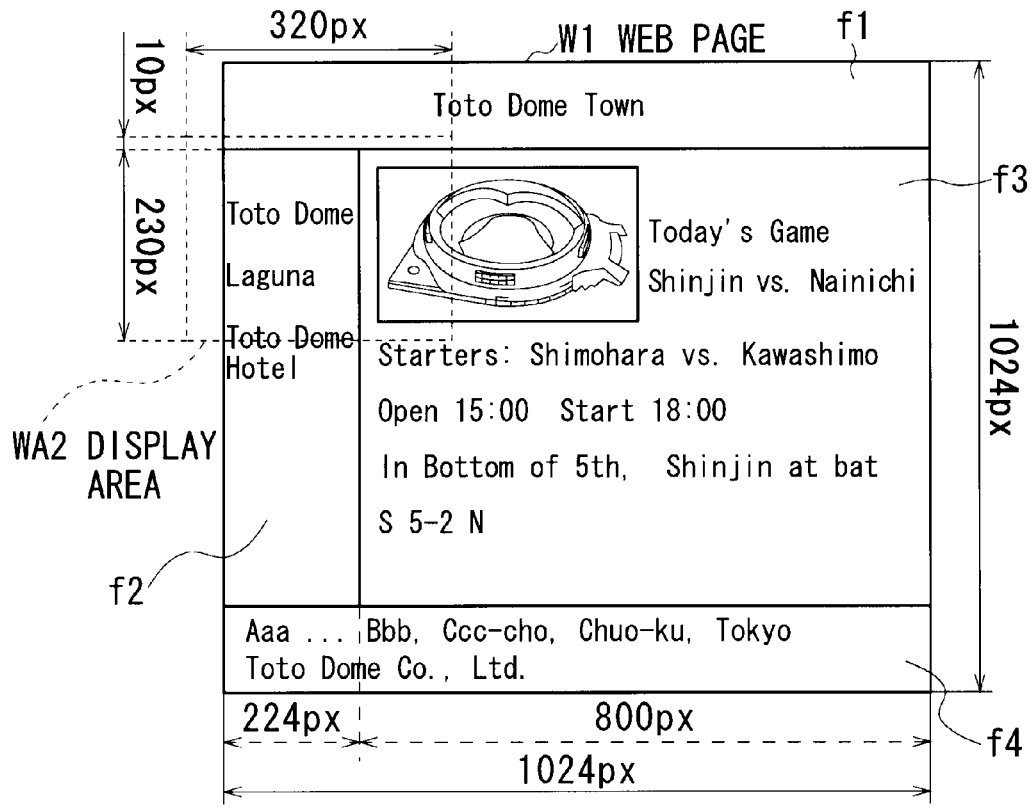
FIGS. 8A and 8B are schematic diagrams showing how a Web page is displayed when an element selected is smaller than or equal to the display size.

Here, the CPU 11 of the PDA 2 reads the Web page data WD (FIG. 2) from the nonvolatile memory 17, and generates the Web page W11 as shown in FIG. 8A based on the HTML data HD and the CSS data CD of the Web page data WD.

The CPU 11 of the PDA 2 then determines whether or not the width of the sidebar element f2 selected by the user, 224 pixels, is greater than the width of the display size of the display 5, 320 pixels.

If the width of the sidebar element f2 is determined to be smaller than or equal to the width of the display size, the CPU 11 of the PDA 2 displays the sidebar element f2 on the display 5 in original size without reducing the Web page W11.

Specifically, the CPU 11 of the PDA 2 sets a display area WA2 so that the sidebar element f2 of the Web page W11 (FIG. 8A) comes to the horizontal center and the upper 230 pixels of the sidebar element f2 can be displayed.

Figure 8B:
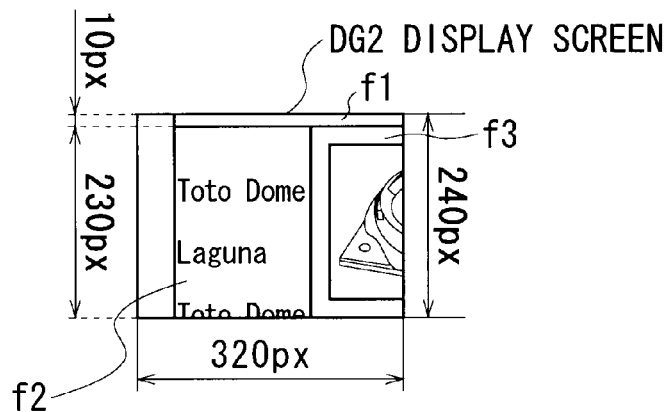

As shown in FIG. 8B, the CPU 11 of the PDA 2 then generates a display screen DG2 corresponding to the display area WA2, and displays the display screen DG2 on the display 5.

The CPU 11 of the PDA 2 can thus display the upper 230-pixel part of the sidebar element f2 selected by the user, and display the lower 10-pixel part of the header element f1 which is arranged above the sidebar element f2 and the upper left part of the content element f3 which is arranged on the right of the sidebar element f2 as well.

In consequence, the CPU 11 of the PDA 2 makes it possible to visually observe the sidebar element f2 selected by the user in its original size. The CPU 11 can also display part of the header element f1 and the content element f3 aside from the sidebar element f2, so that the positional relationship of the sidebar element f2 can be easily recognized.

It should be appreciated that when the down button 6b (FIG. 2) is depressed by the user with the display screen DG2 on the display 5, the CPU 11 of the PDA 2 displays a lower part of the sidebar element f2.

Figure 9A:
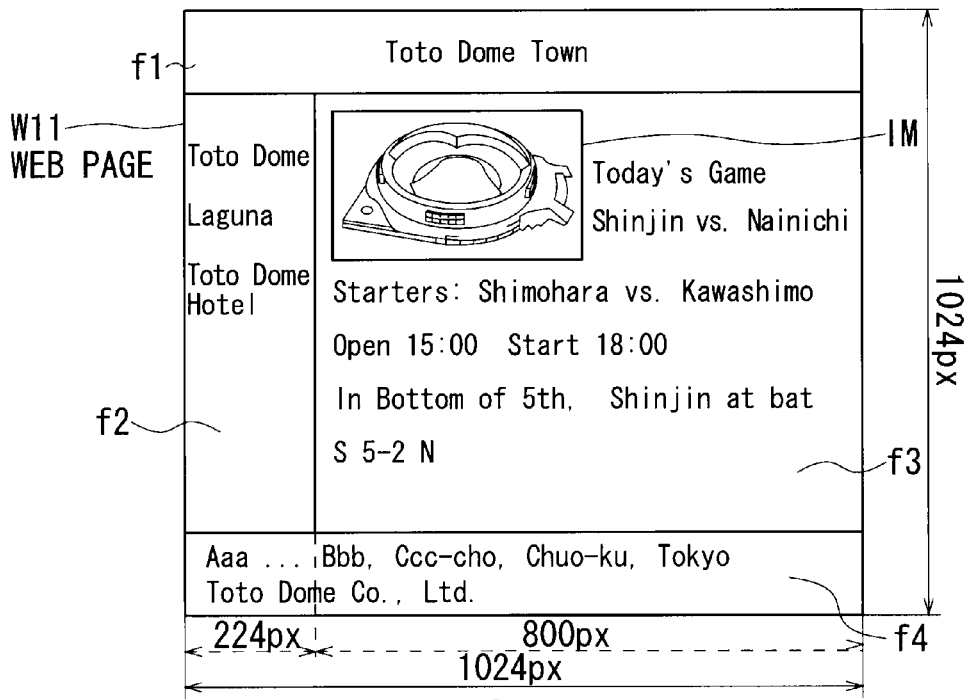
FIGS. 9A to 9C are schematic diagrams showing how the Web page is displayed when the element selected is greater than the display size.

Now, if the CPU 11 of the PDA 2 recognizes through the foregoing process of recognition that a touch operation is made on the content element f3 with the snapshot display screen SG (FIG. 7A) displayed, the CPU 11 reads the Web page data WD from the nonvolatile memory 17 and generates the Web page W11 (FIG. 9A).

The CPU 11 of the PDA 2 then determines whether or not the width of the content element f3 touched by the user, 800 pixels, is greater than the width of the display size of the display 5, 320 pixels.

Figure 9B:
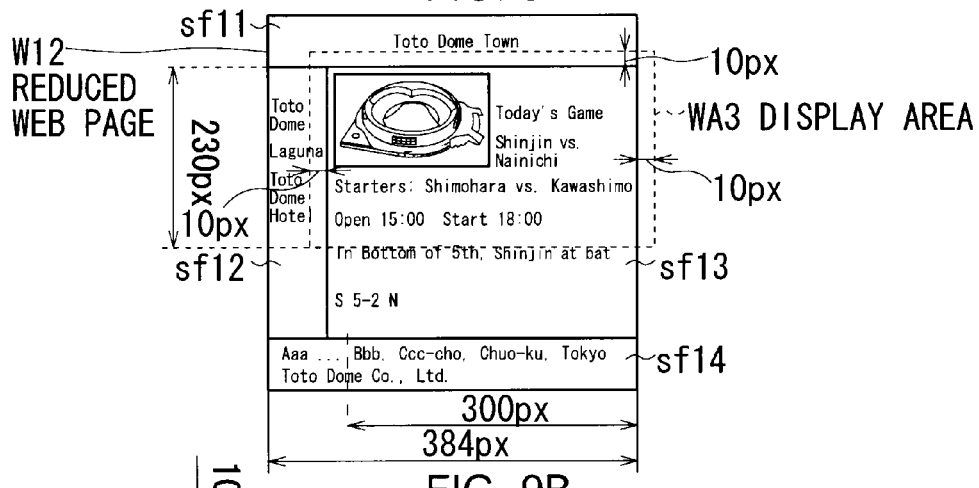

If the width of the content element f3 is determined to be greater than the width of the display size, the CPU 11 of the PDA 2 reduces the Web page W11 by 3/8 times so that the content element f3 having a width of 800 pixels shrinks to a width of 300 pixels. The CPU 11 thereby generates a reduced Web page W12 having a width of 384 pixels as shown in FIG. 9B.

The reduced Web page W12 includes a reduced header element sf11, a reduced sidebar element sf12, a reduced content element sf13, and a reduced footer element sf14 which correspond to the header element f1, the sidebar element f2, the content element f3, and the footer element f4 of the Web page W11, respectively.

When reducing the Web page W11 by 3/8 times, the CPU 11 of the PDA 2 also reduces a dome image IM (FIG. 9A) that is located inside the content element f3 of the Web page W11 by 3/8 times.

In the meantime, the CPU 11 of the PDA 2 does not reduce the character strings located in the content element f3 of the Web page W11 such as "Today's Game" and "Shinjin vs. Nainichi" by 3/8 times, but reduces the character strings by a predetermined magnification for facilitating user's visual observation or does not reduce them at all.

Similarly, the CPU 11 of the PDA 2 reduces the character strings located in the header element f1, sidebar element f2, and footer element f4 of the Web page W11 such as "Toto Dome Town", "Toto Dome", and "Aaa . . . Bbb, Ccc-cho, Chuo-ku, Tokyo" by a predetermined magnification for facilitating user's visual observation, or does not reduce the character strings at all.

Having generated the reduced Web page W12, the CPU 11 of the PDA 2 sets a display area WA3 so that the reduced content element sf13 of the reduced Web page W12 comes to the horizontal center and the upper 230 pixels of the reduced content element sf13 is displayed.

Figure 9C:
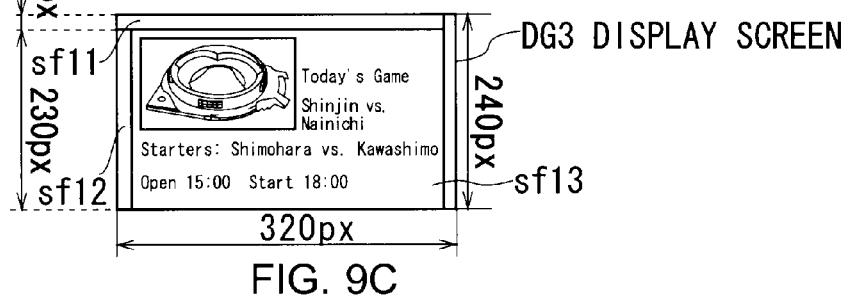

As shown in FIG. 9C, the CPU 11 of the PDA 2 then generates a display screen DG3 corresponding to the display area WA3, and displays the display screen DG3 on the display 5.

The CPU 11 of the PDA 2 can thus display the upper 230-pixel part of the reduced content element sf13, and display the lower 10-pixel part of the reduced header element sf1 which is arranged above the reduced content element sf3 and the upper right part of the reduced sidebar element sf12 which is arranged on the left of the reduced content element sf13 as well.

In consequence, the CPU 11 of the PDA 2 makes it possible to visually observe the reduced content element sf13 corresponding to the content element f3 horizontally all across. The CPU 11 can also display the reduced header element sf11 and the reduced sidebar element sf12 in part, so that the positional relationship of the reduced content element sf13 can be easily recognized.

(3) Procedure of Optimum Layout Display Processing

Figure 10:
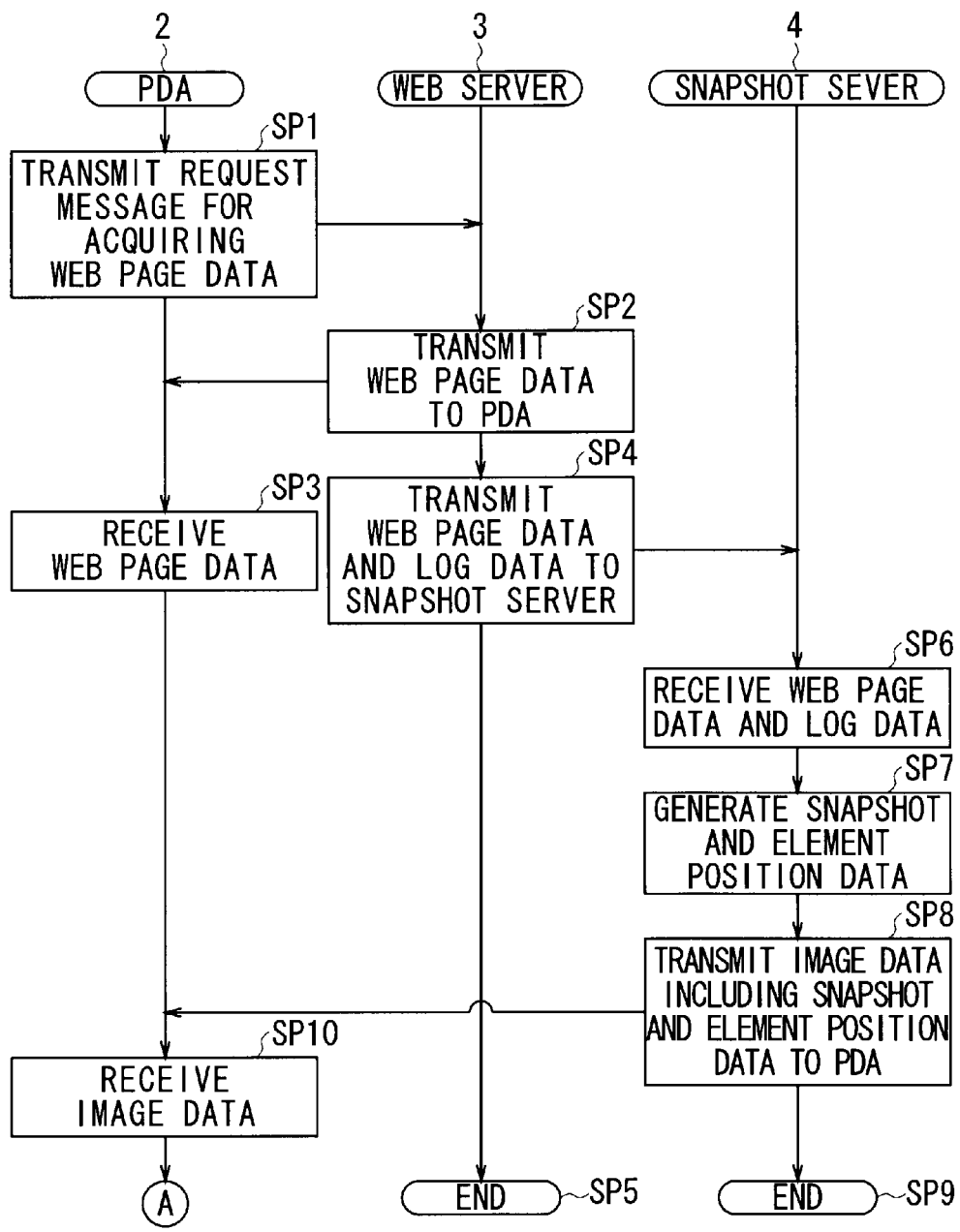
FIG. 10 is a flowchart for explaining the procedure (1) of optimum layout display processing.
Figure 11:
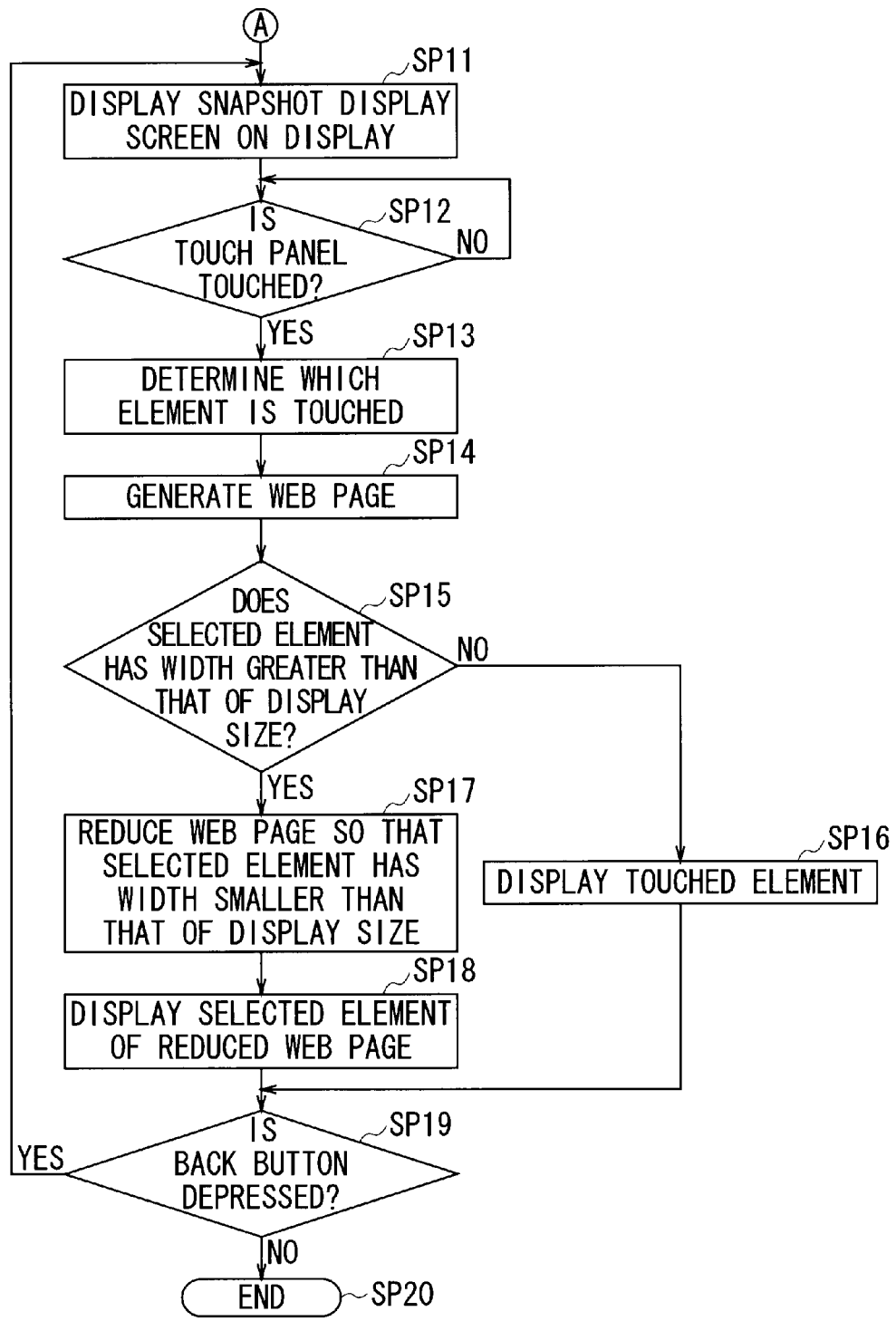
FIG. 11 is a flowchart for explaining the procedure (2) of the optimum layout display processing.

As shown in FIG. 10 and subsequent FIG. 11, the CPU 11 of the PDA 2 transmits a request message to the Web server 3 through the wireless communication unit 16 at step SP1 in order to acquire Web page data WD corresponding to the Web page W11 that is specified by a user operation. The CPU 11 then proceeds to the next step SP2.

At step SP2, the CPU 31 of the Web server 3 receives the request message from the PDA 2 through the communication unit 35. The CPU 31 reads the Web page data WD from the hard disk drive 34 according to the request message, transmits the Web page data WD to the PDA 2 through the communication unit 35, and proceeds to the next step SP3.

At step SP3, the CPU 11 of the PDA 2 receives the Web page data WD from the Web server 3 through the wireless communication unit 16, and stores the Web page data WD into the nonvolatile memory 17. The CPU 11 then proceeds to the next step SP4.

At step SP4, the CPU 31 of the Web server 3 transmits the Web page data WD that is transmitted to the PDA 2 at step SP2 and log data that indicates the transmission of the Web page data WD to the PDA 2 to the snapshot server 4 through the communication unit 35. The CPU 31 then proceeds to the next step SP5 to end the processing.

Meanwhile, at step SP6, the CPU 41 of the snapshot server 4 receives the Web page data WD and the log data from the Web server 3 through the communication unit 45, and stores the Web page data WD into the hard disk drive 44. The CPU 41 then proceeds to the next step SP7.

At step SP7, the CPU 41 of the snapshot server 4 generates a snapshot SS (FIG. 6B) and element position data fp (FIG. 6C) based on the Web page data WD, and proceeds to the next step SP8.

At step SP8, the CPU 41 of the snapshot server 4 transmits image data ID including the snapshot SS and the element position data fp to the PDA 2 through the communication unit 45 based on the log data. The CPU 41 then proceeds to the next step SP9 to end the processing.

Meanwhile, at step SP10, the CPU 11 of the PDA 2 receives the image data ID from the snapshot server 4 through the wireless communication unit 16, and stores the image data ID into the nonvolatile memory 17. The CPU 11 then proceeds to the next step SP11 (FIG. 11).

At step SP11, the CPU 11 of the PDA 2 displays a snapshot display screen SG (FIG. 7A), in the center of which appears the snapshot SS of the image data ID, on the display 5. The CPU 11 then proceeds to the next step SP12.

At step SP12, the CPU 11 of the PDA 2 determines whether or not the touch panel 15 arranged on the surface of the display 5 is touched by the user. If the result is negative, the CPU 11 waits for a touch operation on the touch panel 15. If the result is positive, the CPU 11 proceeds to step SP13.

At step SP13, the CPU 11 of the PDA 2 detects the coordinate values of the point where touched by the user. The CPU 11 compares the coordinate values detected and the element position data fp of the image data ID to recognize, for example, that the reduced sidebar element sf2 is touched by the user. The CPU 11 then proceeds to the next step SP14.

At step SP14, the CPU 11 of the PDA 2 reads the Web page data WD from the nonvolatile memory 17, and generates the Web page W11 (FIG. 8A) based on the HTML data HD and CSS data CD of the Web page data WD. The CPU 11 then proceeds to the next step SP15.

At step SP15, the CPU 11 of the PDA 2 determines whether or not the width of the sidebar element f2 corresponding to the reduced sidebar element sf2 touched by the user, 224 pixels, is greater than the width of the display size, 320 pixels. If the result is negative, the CPU 11 proceeds to the next step SP16.

At step SP16, the CPU 11 of the PDA 2 generates a display screen DG2 (FIG. 8B) that is set so that the sidebar element f2 of the Web page W11 comes to the horizontal center and the upper 230 pixels of the sidebar element f2 is displayed. The CPU 11 displays the display screen DG2 on the display 5, and proceeds to the next step SP19.

At step SP19, the CPU 11 of the PDA 2 determines whether or not the back button 6d (FIG. 2) is depressed by the user. If the result is positive, the CPU 11 returns to step SP11.

At step SP11, the CPU 11 of the PDA 2 displays the snapshot display screen SG (FIG. 7A) on the display 5 again, and proceeds to the next step SP12 to determine whether or not the touch panel 15 is touched by the user. If the result is positive, the CPU 11 proceeds to step SP13.

At step SP13, the CPU 11 of the PDA 2 detects the coordinate values of the point where touched by the user. The CPU 11 compares the coordinate values detected and the element position data fp of the image data ID to recognize, for example, that the reduced content element sf3 is touched. The CPU 11 then proceeds to the next step SP14.

At step SP14, the CPU 11 of the PDA 2 generates the Web page W11 (FIG. 9A) based on the HTML data HD and CSS data CD of the Web page data WD, and proceeds to the next step SP15.

At step SP15, the CPU 11 of the PDA 2 determines whether or not the width of the content element f3 corresponding to the reduced content element sf3 selected by the user, 800 pixels, is greater than the width of the display size, 320 pixels. If the result is positive, the CPU 11 proceeds to the next step SP17.

At step SP17, the CPU 11 of the PDA 2 reduces the Web page W11 by ⅜ times so that the content element f3 having a width of 800 pixels shrinks to a width of 300 pixels. The CPU 11 thereby generates a reduced Web page W12 (FIG. 9B) having a width of 384 pixels, and proceeds to the next step SP18.

At step SP18, the CPU 11 of the PDA 2 generates a display screen DG3 (FIG. 9C) that is set so that the reduced content element sf13 of the reduced Web page W12 comes to the horizontal center and the upper 230 pixels of the reduced content element sf13 is displayed. The CPU 11 displays the display screen DG3 on the display 5, and proceeds to the next step SP19.

At step SP19, the CPU 11 of the PDA 2 determines again whether or not the back button 6d is depressed by the user. If the result is negative, the CPU 11 proceeds to step SP20 to end the processing.

(4) Operation and Effect

With the foregoing configuration, the CPU 11 of the PDA 2 receives Web page data WD corresponding to a user-desired Web page W11 from the Web server 3. The CPU 11 also acquires image data ID from the snapshot server 4, the image data ID including a reduced snapshot SS of the Web page W11 and element position data fp.

The CPU 11 of the PDA 2 then displays the reduced snapshot SS of the Web page W11 on the display 5 through a snapshot display screen SG, thereby allowing the user to visually observe the overall configuration of the Web page W11.

If the user touches the snapshot SS, for example, on the reduced sidebar element sf2, the CPU 11 of the PDA 2 determines that the sidebar element f2 of the Web page W11 corresponding to the reduced sidebar element sf2 has a width smaller than or equal to that of the display size. The CPU 11 then displays the upper part of the sidebar element f2 on the display 5 in its original size.

When displaying the sidebar element f2 on the display 5, the CPU 11 of the PDA 2 displays the upper 230-pixel part of the sidebar element f2, and displays the lower 10-pixel part of the header element f1 which is arranged above the sidebar element f2 and the upper left part of the content element f3 which is arranged on the right of the sidebar element f2 as well.

Consequently, the CPU 11 of the PDA 2 makes it possible to visually observe the user-selected sidebar element f2 in its original size. The CPU 11 can also display the header element f1 and the content element f3 in part, so that the positional relationship of the sidebar element f2 with respect to the entire Web page W11 can be easily recognized.

If the user touches the snapshot SS, for example, on the reduced content element sf3, the CPU 11 of the PDA 2 determines that the content element f3 of the Web page W11 corresponding to the reduced content element sf3 has a width greater than that of the display size. Here, the CPU 11 of the PDA 2 reduces the Web page W11 by ⅜ times, for example, so that the content element f3 has a width smaller than that of the display size. The CPU 11 displays the upper part of the reduced content element sf13 of the resulting reduced Web page W12 on the display 5.

While reducing the dome image IM located in the content element f3 of the Web page W11 by ⅜ times, the CPU 11 of the PDA 2 reduces the character strings such as "Today's Game" by a predetermined magnification or does not reduce them at all. As a result, the CPU 11 of the PDA 2 can display the reduced content element sf13 in a manner that facilitates user's visual observation without breaking the layout of the Web page W11.

When the CPU 11 of the PDA 2 displays the reduced content element sf13 corresponding to the content element f3 on the display 5, the CPU 11 also displays the reduced header element sf11 and the reduced sidebar element sf12 in part, so that the positional relationship of the reduced content element sf13 with respect to the reduced Web page W12 can be easily recognized.

Figure 12A:
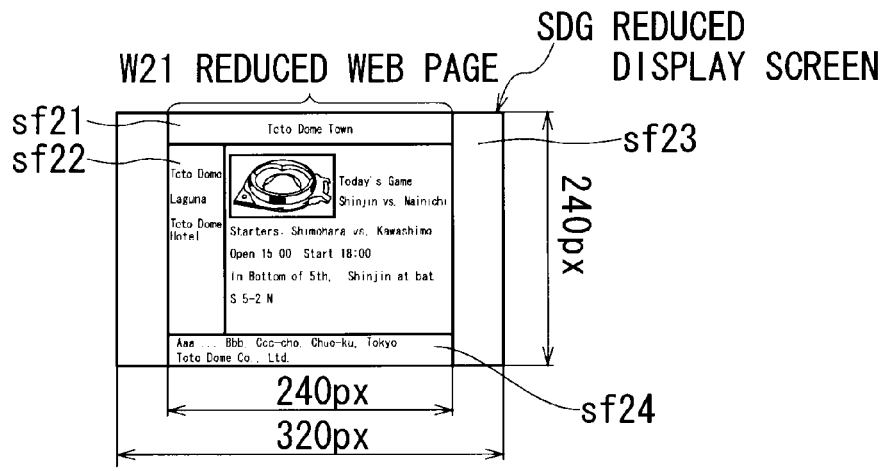
FIGS. 12A to 12C are schematic diagrams showing conventional enlarged display of a Web page.

Now, take the case of a conventional PDA. As shown in FIG. 12A, the conventional PDA reduces the Web page W11 into a reduced Web page W21, for example, and displays a reduced display screen SDG on the display with the reduced Web page W21 in the center.

Figure 12B:
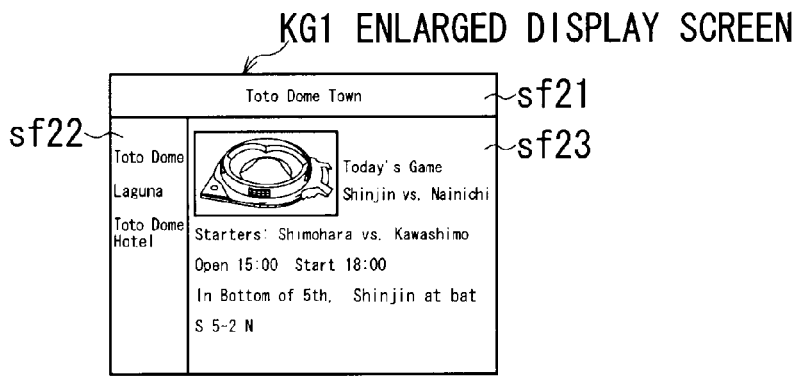

If the touch panel is touched by the user through the reduced display screen SDG with the reduced display screen SDG on the display, the PDA displays an enlarged display screen KG1 which is the reduced Web page W21 enlarged by a predetermined ratio as shown in FIG. 12B.

Figure 12C:
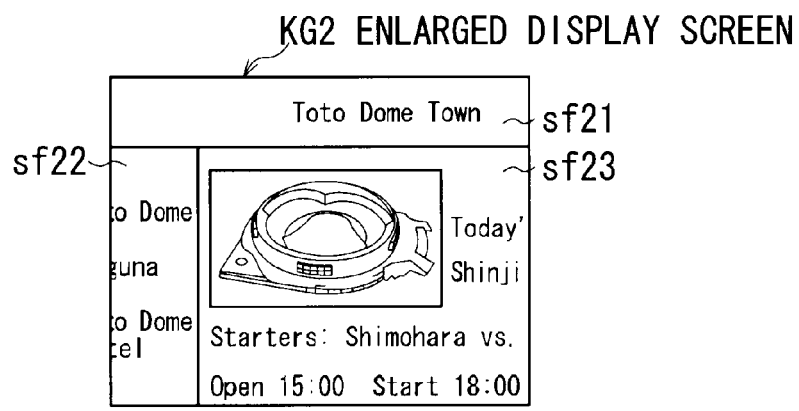

If the touch panel is touched by the user again with the enlarged display screen KG1 on the display, the PDA displays an enlarged display screen KG2 which is the reduced Web page W21 further enlarged by a predetermined ratio on the display as shown in FIG. 12C. The PDA can thus provide the user with a reduced content element sf23 that is enlarged to a desired size.

In this case, the PDA requires the user to touch the touch panel a plurality of times before the reduced content element sf23 of desired size is displayed on the display through the enlarged display screen KG2, requiring complicated operations.

Since the PDA enlarges the reduced Web page W21 by predetermined ratios to display the enlarged display screens KG1 and KG2, the PDA also displays in large proportions a reduced header element sf21 and a reduced sidebar element sf22 which are arranged around the reduced content element sf23.

Moreover, since the PDA enlarges the reduced Web page W21 by predetermined ratios to display the enlarged display screens KG1 and KG2, it is sometimes not possible to display the reduced content element sf23 horizontally all across. It follows that the PDA is not able to display the reduced content element sf23 in a display mode easily viewable to the user.

In contrast, the PDA 2 according to the embodiment of the present invention displays the snapshot display screen SG (FIG. 7A), and a single touch operation has only to be made on the user-desired reduced content element sf3 to display the display screen DG3 (FIG. 9C) in which the reduced content element sf13 of the reduced Web page W21 (FIG. 9B) is arranged.

Here, the PDA 2 displays the reduced content element sf13 horizontally all across on the display screen DG3, so that the reduced content element sf13 can be displayed in a display mode easily viewable to the user.

As described above, the PDA 2 makes it possible to visually observe the reduced content element sf13 corresponding to the content element f3 desired by the user in a display mode easily viewable to the user by means of only a single touch operation, without requiring complicated operations of the user.

Figure 13:
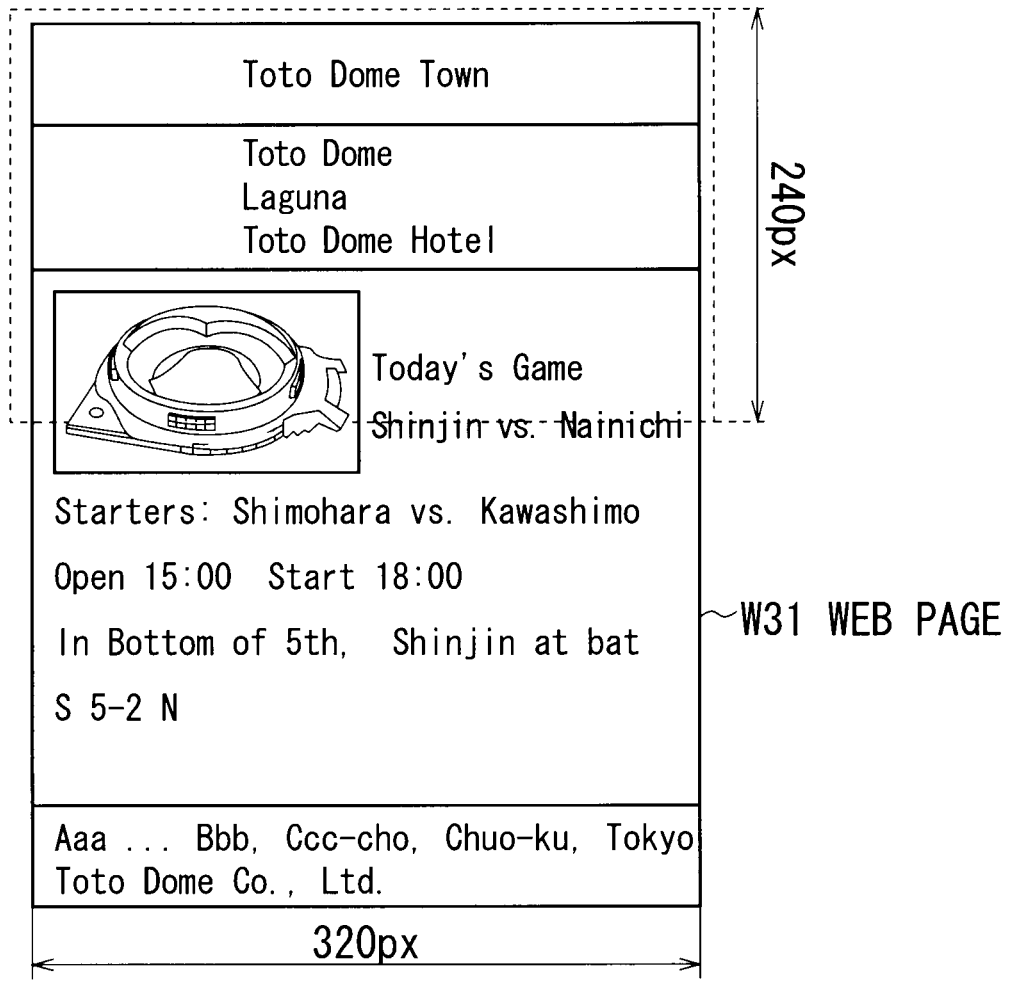
FIG. 13 is a schematic diagram showing conventional display of a Web page with a broken layout.

As shown in FIG. 13, some conventional PDA will not consult the CSS data CD of the Web page data WD but destroys the layout to generate a Web page W31 to the display size of 320 pixels in width. The PDA then displays the upper part of the Web page W31 on the display.

It follows that the PDA displays the Web page 31 on the display with a broken layout, and there has thus been the problem that it is difficult for the user to grasp the overall configuration of the Web page W11 in its original layout.

In contrast, the PDA 2 according to the embodiment of the present invention can display a user-desired element, such as the sidebar element f2 and the content element f3, without breaking the layout of the Web page W11. This can facilitate the user grasping the overall configuration of the Web page W11.

According to the foregoing configuration, the PDA 2 displays the reduced snapshot SS of the Web page W11 on the display 5. If, for example, the content element f3 specified by the user is greater than the display size, the PDA 2 reduces and displays the Web page W11 so that the content element f3 is smaller than the display size. Consequently, the PDA 2 can display the Web page W11 in an easily viewable fashion without breaking the layout of the Web page W11.

(5) Other Embodiments

The foregoing embodiment has dealt with the case where the CPU 11 of the PDA 2 receives the Web page data WD from the Web server 3 and receives the image data ID from the snapshot server 4. However, the present invention is not limited thereto. Upon receiving the Web page data WD from the Web server 3, the CPU 11 of the PDA 2 may generate the Web page W11 based on the Web page data WD and generate the reduced snapshot SS of the Web page W11 and the element position data fp.

In this case, the PDA 2 can perform the foregoing optimum layout display processing without receiving the image data ID from the snapshot server 4.

Figure 14:
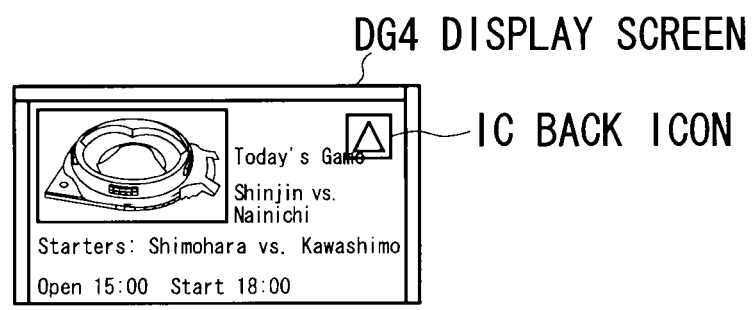
FIG. 14 is a schematic diagram showing a display screen according to another embodiment.

The foregoing embodiment has also dealt with the case where the snapshot display screen SG (FIG. 7A) is displayed again when the back button 6d (FIG. 2) is depressed, for example, in the state that the display screen DG3 (FIG. 9C) having part of the reduced Web page W12 (FIG. 9B) arranged therein is displayed on the display 5. However, the present invention is not limited thereto. As shown in FIG. 14, the CPU 11 of the PDA 2 may display a display screen DG4, which is the display screen DG3 with a back icon IC superimposed thereon, on the display 5. The CPU 11 then displays the snapshot display screen SG again if the user touches the back icon IC.

The foregoing embodiment has also dealt with the case where the Web server 3 transmits the Web page data WD to the PAD 2 and transmits the Web page data WD to the snapshot server 4, and the snapshot server 4 generates the image data ID. However, the present invention is not limited thereto. The snapshot server 4 may receive the Web page data WD from the Web server 3 regularly in advance and generate the image data ID.

In this case, the snapshot server 4 can transmit the image data ID to the PDA 2 immediately when the log data is received from the web server 3.

The foregoing embodiment has also dealt with the case where the CPU 11 of the PDA 2 determines, for example, that the reduced sidebar element sf2 is selected, based on a touch operation on the touch panel 15 with the snapshot display screen SG (FIG. 7A) displayed on the display 5. However, the present invention is not limited thereto. The CPU 11 of the PDA 2 may display a cursor as superimposed on the snapshot display screen SG and determine that the reduced sidebar element sf2 is selected, for example, when the enter button 6c is depressed with the cursor on the reduced sidebar element sf2.

The foregoing embodiment has also dealt with the case where the CPU 11 of the PDA 2 determines that the reduced content element sf3 of the snapshot display screen SG is touched, for example, and reduces the Web page data W11 by ⅜ times. However, the present invention is not limited thereto. For example, when the CPU 11 determines that the reduced content element sf3 of the snapshot display screen SG is touched, the CPU 11 may reduce the Web page W11 so that the content element f3 of the Web page data W11 shrinks to 320 pixels, the width of the display size.

The foregoing embodiment has also dealt with the case where the CPU 11 of the PDA 2 and the CPU 41 of the snapshot server 4 set the height of the Web page W11 at 1024 pixels by default if the height of the Web page W11 is not defined by the HTML data HD or the CSS data CD. However, the present invention is not limited thereto. The CPU 11 of the PDA 2 and the CPU 41 of the snapshot server 4 may generate a Web page to a height based on the HTML data HD and the CSS data CD.

In this case, the CPU 11 of the PDA 2 and the CPU 41 of the snapshot server 4 may reduce the Web page having a height according to the description of the HTML data HD and the CSS data CD into a reduced Web page so that the Web page shrinks to 240 pixels in width, for example. The CPU 11 of the PDA 2 then displays the upper 240-pixel part of the reduced Web page on the display 5, allowing the user to visually observe the reduced Web page.

The foregoing embodiment has also dealt with the case where the CPU 11 of the PDA 2, the CPU 31 of the web server 3, and the CPU 41 of the snapshot server 4 perform the foregoing procedure of the optimum layout display processing (FIGS. 10 and 11) according to the application programs that are previously stored in the ROMs 12, 32, and 42. However, the present invention is not limited thereto. The CPU 11 of the PDA 2, the CPU 31 of the Web server 3, and the CPU 41 of the snapshot server 4 may perform the foregoing procedure of the optimum layout display processing according to application programs that are installed from a recording medium, application programs that are downloaded over the Internet, or application programs that are installed through various other routes.

The foregoing embodiment has also dealt with the case where the PDA 2 as the Web page display apparatus according to the embodiment of the present invention includes the wireless communication unit 16 as an acquisition unit, and the CPU 11 as a generation unit and a display control unit. The present invention is not limited thereto, however, and the Web page display apparatus may be composed of an acquisition unit, generation unit, and display control unit of various other configurations.

The Web page display apparatus and the Web page display method according to the embodiment of the present invention may be applied to various other types of mobile devices such as a cellular phone, a personal navigation device (PND), a notebook personal computer, and a game console.

The present application contains subject matter related to that disclosed in Japanese Patent Application JP2008-141175 filed in the Japan Patent Office on May 29, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A Web page display apparatus comprising:
circuitry of computer hardware configured to:
acquire a Web page including a plurality of elements, the elements defining the Web page;
control a display to display a reduced image of the Web page, the reduced image having a same plurality of elements as the acquired Web page, each of which is reduced in size such that all of the plurality of elements of the Web page are simultaneously displayed on the display and the reduced image is smaller than or equal to a display size of the display;
generate a reduced Web page by reducing the acquired Web page, in response to a user selecting an element of the reduced image whose corresponding element within the acquired Web page has a width which is greater than a width of the display size of the display, by reducing the acquired Web page so that the width of the corresponding element is made smaller than or equal to that of the display size; and
control the display to display the corresponding element of the reduced Web page so that content within the corresponding element of the reduced Web page is widthwise visible to the user.

2. The Web page display apparatus according to claim 1, wherein the circuitry is configured to control the display to display the corresponding element in its original size when the corresponding element has a width smaller than or equal to that of the display size.

3. The Web page display apparatus according to claim 2, wherein the circuitry is configured to:
control the display to display the reduced corresponding element simultaneously together with a plurality of reduced elements of the acquired Web page arranged peripherally around the reduced corresponding element on the reduced Web page when the corresponding element has a width greater than that of the display size, and
control the display to display the corresponding element simultaneously together with a plurality of elements of the acquired Web page arranged peripherally around the corresponding element on the Web page when the corresponding element has a width smaller than or equal to that of the display size.

4. The Web page display apparatus according to claim 1, wherein:
the circuitry is configured to generate the reduced image from the acquired Web page.

5. A Web page display method comprising:
acquiring a Web page, via circuitry of a
Web page display apparatus, the Web page including a plurality of elements, the elements defining the Web page;
displaying, via the circuitry, a reduced image of the Web page, the reduced image having a same plurality of elements as the Web page, each of which is reduced in size such that all of the plurality of elements of the Web page are simultaneously displayed on the display and the reduced image is smaller than or equal to a display size of the display;
generating, via the circuitry, a reduced Web page by reducing the acquired Web page, in response to a user selecting an element of the reduced image whose corresponding element with the acquired Web page has a width which is greater than a width of the display size of the display, by reducing the acquired Web page so that the width of the corresponding element is made smaller than or equal to that of the display size; and
displaying the corresponding element of the reduced Web page so that content within the corresponding element of the reduced Web page is widthwise visible to the user.

6. The Web page display apparatus according to claim 1, wherein the circuitry is configured to reduce a size of an image within the corresponding element by an amount the corresponding selected element is reduced.

7. The Web page display apparatus according to claim 6, wherein circuitry is configured to not reduce a font size of text within the corresponding element.

8. The Web page display apparatus according to claim 6, wherein circuitry is configured to reduce a font size of text within the corresponding element.

9. The Web page display apparatus according to claim 1, wherein the circuitry is configured to not reduce a font size of text within the corresponding element.

10. The Web page display apparatus according to claim 1, wherein the circuitry is configured to:
- receive a coordinate input to the displayed reduced image and determine a corresponding coordinate in the acquired Web page corresponding to the coordinate input;
- determine the corresponding element in the acquired Web page which corresponds to the coordinate input based upon the corresponding coordinate; and
- generate the reduced Web page from the acquired Web page such that the display displays the corresponding element of the reduced Web page corresponding to the coordinate input.

11. A Web page display apparatus comprising:
circuitry of computer hardware configured to:
- acquire a Web page including a plurality of elements, the elements defining a container in which Web objects are displayed;
- control a display to display a reduced image of the Web page, the reduced image having a same plurality of elements as the Web page, each of which is reduced in size such that all of the plurality of elements of the Web page are simultaneously displayed on the display and the reduced image is smaller than or equal to a display size of the display;
- generate a reduced Web page by reducing the acquired Web page, in response to a user selecting an element of the reduced image whose corresponding element within the acquired Web page has a width which is greater than a width of the display size of the display, by reducing the acquired Web page so that the width of the corresponding element is made smaller than or equal to that of the display size; and
- control the display to display the corresponding element of the reduced Web page so that content within the corresponding element of the reduced Web page is widthwise visible to the user.

12. The Web page display apparatus according to claim 1, wherein the selected element contains one or more Web objects, the Web objects being one of an image, text, or a combination thereof.

13. The Web page display apparatus according to claim 5, wherein the selected element contains one or more Web objects, the Web objects being one of an image, text, or a combination thereof.

14. The Web page display apparatus according to claim 12, wherein the circuitry is configured to not alter a widthwise size of one or more Web objects within the corresponding element corresponding to the one or more Web objects of the selected element.

15. The Web page display apparatus according to claim 13, wherein the circuitry is configure to not alter a widthwise size of one or more Web objects within the corresponding element corresponding to the one or more Web objects of the selected element.

16. The Web page display apparatus according to claim 12, wherein a widthwise size of the one or more Web objects is smaller widthwise than a widthwise size of the selected element.

17. The Web page display apparatus according to claim 13, wherein a widthwise size of the one or more Web objects is smaller widthwise than a widthwise size of the selected element.

18. The Web page display apparatus according to claim 1, wherein
- the circuitry is configured to acquire the reduced image, and
- the reduced image is acquired from a source different from that which the acquired Web page is acquired.

19. The Web page display apparatus according to claim 6, wherein the circuitry is configured to reduce a size of text within the corresponding element by an amount different from that which the image is reduced.

20. A non-transitory computer readable medium storing instructions which when executed by a computer cause the computer to perform the method according to claim 5.

* * * * *